Oct. 16, 1923.
J. WHISLER
CLUTCH
Filed Dec. 7, 1921
1,471,226
2 Sheets-Sheet 1
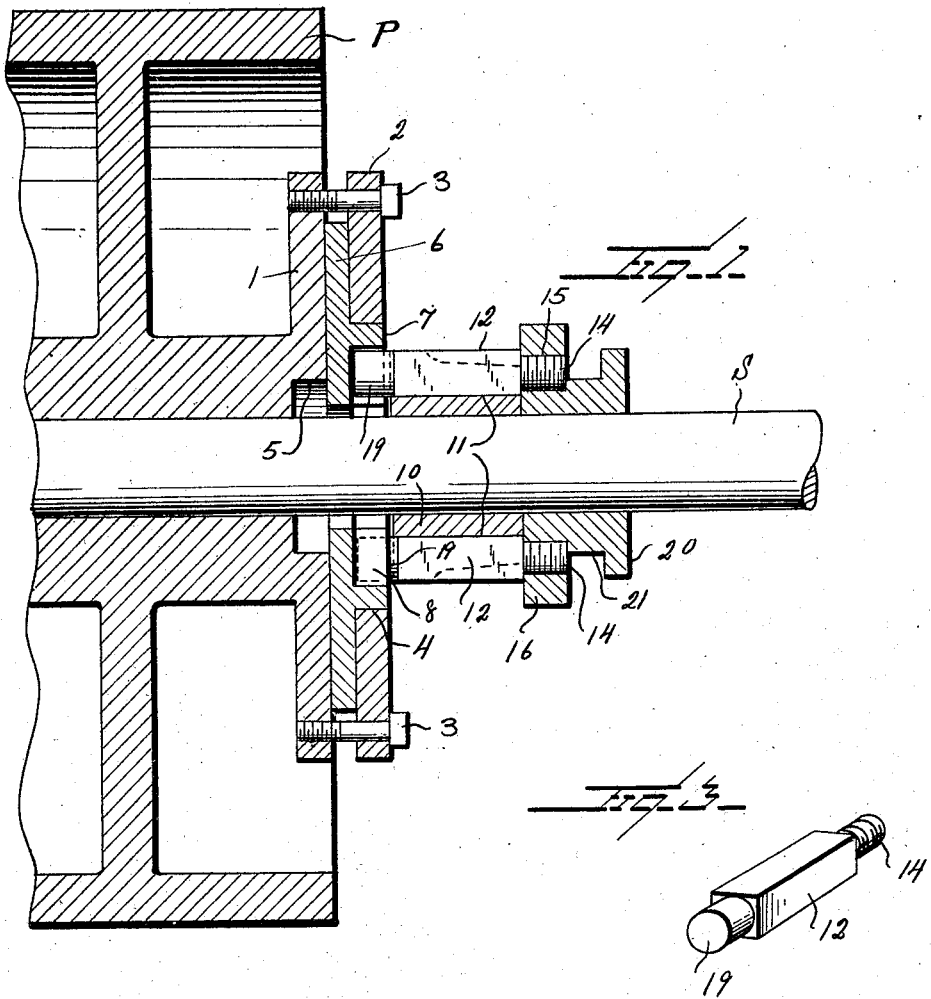
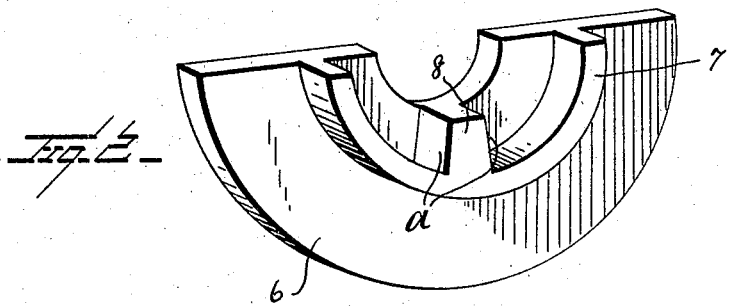
Inventor
J. Whisler
By Watson E. Coleman
Attorney Oct. 16, 1923.  
J. WHISLER  
CLUTCH  
Filed Dec. 7, 1921  
1,471,226  
2 Sheets-Sheet 2

Inventor  
J. Whisler  
By Watson E. Coleman  
Attorney

Patented Oct. 16, 1923.

1,471,226

UNITED STATES PATENT OFFICE.

JOHN WHISLER, OF GIBSON, IOWA.

CLUTCH.

Application filed December 7, 1921. Serial No. 520,653.

*To all whom it may concern:*

Be it known that I, JOHN WHISLER, a citizen of the United States, residing at Gibson, in the county of Keokuk and State of Iowa, have invented certain new and useful Improvements in Clutches, of which the following is a specification, reference being had to the accompanying drawings.

This invention relates to certain improvements in clutches and has relation more particularly to a device of this general character of a friction type, and it is an object of the invention to provide a device of this general character embodying novel and improved means whereby a driven element may be caused to rotate or be brought to a stop without jerk.

Another object of the invention is to provide a novel and improved device of this general character embodying an element carried by a driven member and which element includes relatively movable parts frictionally engaged for unitary movement under a given load, together with an element carried by a driving member movable into and out of working engagement with one of the independently rotatable parts of the element carried by the driven member.

The invention consists in the details of construction and in the combination and arrangement of the several parts of my improved clutch whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view partly in section and partly in elevation illustrating a clutch constructed in accordance with an embodiment of my invention;

Figure 2 is a view in perspective of one of the friction plates as herein disclosed;

Figure 3 is a view in perspective of one of the fingers or pawls carried by the sliding or movable member;

Figure 4:
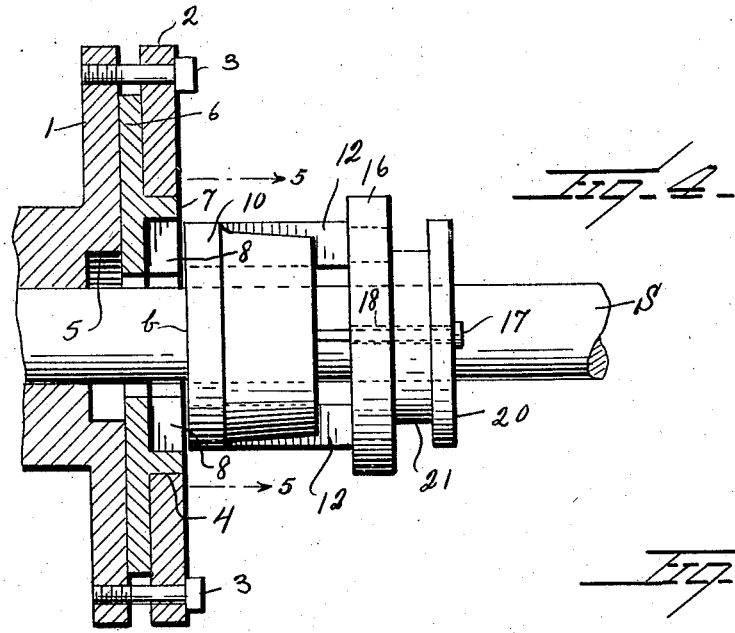
Figure 4 is a view partly in section and partly in elevation showing my improved clutch in released position.
Figure 5:
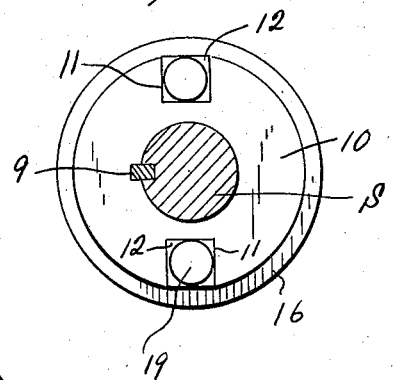
Figure 5 is a sectional view taken substantially on the line 5—5 of Figure 4.
Figure 6:
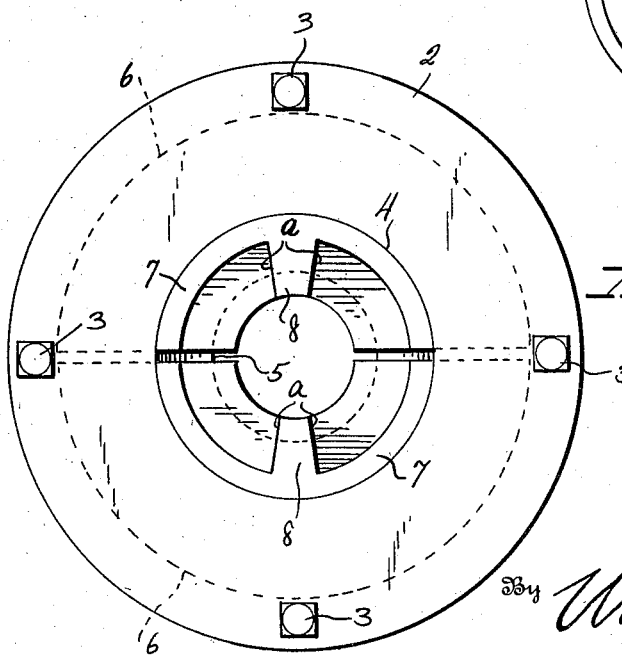
Figure 6 is an elevational view of the clutch as herein disclosed with the shaft and certain of the parts omitted.

As disclosed in the accompanying drawings, S denotes a line shaft or other driving rotatable member and on which is loosely mounted a pulley P or other driven member adapted to be rotated with the shaft S or the like.

Cast or otherwise fixed to a face of the pulley or driven member P is an annular plate 1 surrounding the shaft or driving member S. Overlying the plate 1 is a second annular plate 2 also surrounding the shaft or driving member S. The plate 2 is fixed to the plate 1 through the instrumentality of the headed members 3 disposed through the peripheral marginal portion of the plate 2 and in threaded engagement with the plate 1, the connection afforded by the members 3 causing the plate 2 to rotate with the plate 1 and its associated pulley or member P.

As herein disclosed, the bore or central opening 4 of the plate 2 is of a greater diameter than the bore or central opening 5 of the plate 1, said bores or openings 4 and 5, however, being concentric to a common axis.

Interposed between the plates 1 and 2 and free of positive connection therewith are the arcuate friction plates 6 each substantially semicircular in form and providing relatively broad flat faces for frictional contact with the opposed faces of the plates 1 and 2. The friction plates 6, when applied, straddle the driving shaft or member S from opposite sides and the width of said plates is such as to have their inner marginal portions terminate inwardly of the smaller central opening or bore 5 of the plate 1.

Each of the plates 6 is provided with an outstanding arcuate flange 7 adapted for close contact with the wall of the central opening or bore 4 of the plate 2 whereby the applied plates 6 are mounted between the plates 1 and 2 for rotary movement independently of said plates 1 and 2 in substantially a fixed path of travel and about the axis common to both of the central openings or bores 4 and 5.

The members 3 can be readily operated to move the plates 1 and 2 one relative to the other in order to increase or decrease the frictional contact between the plates 6 and the plates 1 and 2 in accordance with the required tension for the load the driven pulley or member P is adapted to pull.

It is of decided advantage to employ a plurality of plates 6 because the same can be readily renewed in case of undue wear or if one or more of said plates should otherwise become unfit for use.

Each of the plates 6 at the side thereof from which the flange 7 extends and substantially centrally of said flange is provided with an outstanding lug 8, said lug preferably having its outer face flush with the outer edge of the adjacent flange and of a length to bridge the space between said flange and the inner edge of the plate 6. By this construction of each of the plates 6, the lugs 8 of the plates, when the device is assembled in its entirety, are substantially diametrically opposed.

It is also preferred that the side faces $a$ of the lugs 8 converge toward their free ends or the ends thereof remote from the flanges 7.

Keyed, as at 9, or otherwise fixed to the driving shaft or member S for rotation therewith is an annular member or head 10, said member or head being positioned upon the shaft or member S in close proximity to the outer plate 2, the face of the member or head 10 opposed to the plate 2 being flat, said outer face $b$ being preferably of a major diameter substantially equal to the mean diameter of the field defined by the flanges 7. It is also of advantage to have the member or head 10 gradually reduced in diameter from its inner face $b$ to its opposite end, although this is not imperative.

At substantially diametrically opposed points, the periphery of the casting or head 10 has produced entirely thereacross and in a direction parallel to the axis of the shaft or member S, the open-ended grooves or channels 11 through which are adapted to have endwise movement the fingers or pawls 12. The outer end of each of the pawls or fingers 12 is provided with a reduced extension 14 for threaded engagement within an opening 15 produced in the outer marginal portion of the sliding member or sleeve 16 mounted upon the shaft or member S. The pawls or fingers 12 key the shifting member or sleeve 16 to the casting or head 10 whereby said sliding member or sleeve 16 is rotated with the shaft or member S but is permitted to have independent movement in opposite directions lengthwise of the shaft or member S. The movement of the sliding member or sleeve 16 in one direction is limited by contact of said member or sleeve with the adjacent face of the casting or head 10. The movement of the member or sleeve 16 in the opposite direction is under control of a headed member 17 freely disposed through an opening 18 produced in the sleeve or member 16 and secured to the adjacent face of the casting or head 10.

When the sliding member or sleeve 16 is at the limit of its inward movement or movement in a direction toward the casting or head 10, the outer or free end portions of the pawls or fingers 12 project beyond the face $b$ of the casting or head 10 and to an extent sufficient to project within the central opening or bore 4 of the plate 2 and in a path of travel intersected by the lugs 8 of the plates 6 so that, as the shaft or member S rotates, the outer end portions of the pawls or fingers 12 will engage the lugs 8 in a manner to cause the plates 6 to rotate therewith.

Upon initial engagement or contact between the pawls or fingers 12 and the lugs 8, the friction plates 6 will be rotated independently of the plates 1 and 2 so that the resultant starting or rotation of the pulley or driven member P as a result of the frictional contact between the plates 1 and 2 and the plates 6 will be accomplished with ease and without jerk.

The same condition is true when the member or sleeve 16 is moved outwardly in a direction to disengage the pawls or fingers 12 from the lugs 8 and when it is desired that the pulley or driven member P shall become idle.

Each of the grooves or channels 11 is preferably angular in cross section with the coacting pawl or finger 12 of corresponding cross sectional configuration so that said pawl or finger 12 will fit substantially snugly within its associated groove or channel 11. By this arrangement, the pawl or finger 12 is held against such rotary movement which would otherwise have a tendency to accidentally disconnect the same from the sliding member or sleeve 16.

The outer or free end portion of each of the pawls or fingers 12, at 19, is circular in cross section so that the contact of the pawl or finger with a lug 8 results in the desired cooperation between the sliding sleeve or member 16 and the plates 6 without undue hindrance or interference.

The sliding member or sleeve 16 is provided with an extension or hub 20 disposed in a direction away from the casting or head 10 and the periphery of said extension or hub 20 is provided with a circumferentially directed annular groove 21 in which is adapted to be operatively engaged in a well known manner a shifting fork (not shown) so that the sliding member or sleeve 16 may be moved in the desired direction lengthwise of the shaft or driving element S in accordance with the requirements of practice.

From the foregoing description it is thought to be obvious that a clutch constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

In combination with a driving element, a driven member loosely mounted thereon and provided with a plate, a second plate overlying the first named plate, means for connecting said plates one to the other and for moving one of said plates relative to the other, said second plate being provided with a central opening concentric to the driving element, a friction plate interposed between the first named plates, said plate freely surrounding the driving element and provided with an outstanding flange extending within the central opening of the second plate and having close contact with the wall of said opening, an outstanding lug carried by the friction plate inwardly of the flange thereof, a head fixture on the driving element, a member slidably mounted upon the driving element and a finger extending outwardly from the sliding member and having movement through the head whereby the sliding member is keyed to the driving element, the finger of the sliding member upon movement of the sliding member toward the head adapted to have working engagement with the lug of the friction plate.

In testimony whereof I hereunto affix my signature.

JOHN WHISLER.